US010428760B2

(12) United States Patent
Lineton et al.

(10) Patent No.: US 10,428,760 B2
(45) Date of Patent: Oct. 1, 2019

(54) PISTON WITH THERMALLY INSULATING INSERT AND METHOD OF CONSTRUCTION THEREOF

(71) Applicant: Federal-Mogul, LLC, Southfield, MI (US)

(72) Inventors: Warran Boyd Lineton, Chelsea, MI (US); Miguel Azevedo, Ann Arbor, MI (US); Greg Salenbien, Britton, MI (US)

(73) Assignee: Tenneco Inc., Lake Forest, IL (US)

( * ) Notice: Subject to any disclaimer, the term of this patent is extended or adjusted under 35 U.S.C. 154(b) by 352 days.

(21) Appl. No.: 15/480,066

(22) Filed: Apr. 5, 2017

(65) Prior Publication Data

US 2017/0284334 A1 Oct. 5, 2017

Related U.S. Application Data

(60) Provisional application No. 62/318,353, filed on Apr. 5, 2016.

(51) Int. Cl.
*F02F 3/14* (2006.01)
*F02F 3/26* (2006.01)
(Continued)

(52) U.S. Cl.
CPC ............... *F02F 3/14* (2013.01); *B32B 3/26* (2013.01); *B32B 3/266* (2013.01); *B32B 5/00* (2013.01);
(Continued)

(58) Field of Classification Search
CPC ........ F02F 3/14; F02F 3/12; F02F 3/10; F02F 3/0084; F02F 3/26; F02B 77/02
See application file for complete search history.

(56) References Cited

U.S. PATENT DOCUMENTS 4,587,177 A 5/1986 Toaz et al.
4,838,149 A * 6/1989 Donnison ................. F02F 3/14
123/193.6
(Continued)

FOREIGN PATENT DOCUMENTS

DE 10049786 A1 5/2001
DE 102006045729 A1 4/2008
(Continued)

OTHER PUBLICATIONS

International Search Report, dated Jun. 30, 2017 (PCT/US2017/026225).

*Primary Examiner* — Jacob M Amick
(74) *Attorney, Agent, or Firm* — Robert L. Stearns; Dickinson Wright, PLLC (57) ABSTRACT

A piston for an internal combustion engine and method of construction thereof are provided. The piston includes an upper crown formed at least in part by a first metal material and a thermally insulating insert. The upper crown has an upper wall forming an upper combustion surface and a ring belt region. The upper combustion surface is formed at least in part by the thermally insulating insert. The thermally insulating insert has a base surface with pores extending upwardly therein. The first metal material is infused and solidified in the pores, with the first metal material forming a first bonding surface. The piston further includes a body portion formed from a second metal material. The body portion provides pin bosses having coaxially aligned pin bores and diametrically opposite skirt portions. The body portion has a second bonding surface bonded to the first bonding surface of the first metal material.

32 Claims, 8 Drawing Sheets (51) Int. Cl.
  *B32B 5/00*      (2006.01)
  *F02F 3/12*      (2006.01)
  *F02B 77/02*     (2006.01)
  *B32B 5/02*      (2006.01)
  *B32B 7/04*      (2019.01)
  *B32B 7/08*      (2019.01)
  *B32B 9/00*      (2006.01)
  *B32B 9/04*      (2006.01)
  *B32B 15/04*     (2006.01)
  *B32B 15/092*    (2006.01)
  *B32B 15/098*    (2006.01)
  *B32B 15/14*     (2006.01)
  *B32B 15/18*     (2006.01)
  *B32B 15/20*     (2006.01)
  *B32B 27/20*     (2006.01)
  *B32B 27/38*     (2006.01)
  *B32B 27/42*     (2006.01)
  *B32B 3/26*      (2006.01)
  *F02F 3/00*      (2006.01)
  *F02B 23/06*     (2006.01)
  *F02F 3/22*      (2006.01)
  *C04B 41/88*     (2006.01)
  *C04B 41/51*     (2006.01)
  *C04B 111/00*    (2006.01)

(52) U.S. Cl.
  CPC .............. *B32B 5/02* (2013.01); *B32B 7/04* (2013.01); *B32B 7/08* (2013.01); *B32B 9/005* (2013.01); *B32B 9/007* (2013.01); *B32B 9/041* (2013.01); *B32B 15/043* (2013.01); *B32B 15/092* (2013.01); *B32B 15/098* (2013.01); *B32B 15/14* (2013.01); *B32B 15/18* (2013.01); *B32B 15/20* (2013.01); *B32B 27/20* (2013.01); *B32B 27/38* (2013.01); *B32B 27/42* (2013.01); *F02B 77/02* (2013.01); *F02F 3/0015* (2013.01); *F02F 3/12* (2013.01); *F02F 3/26* (2013.01); *B32B 2250/03* (2013.01); *B32B 2255/00* (2013.01); *B32B 2255/02* (2013.01); *B32B 2255/10* (2013.01); *B32B 2255/205* (2013.01); *B32B 2307/304* (2013.01); *B32B 2307/546* (2013.01); *B32B 2307/714* (2013.01); *B32B 2605/00* (2013.01); *C04B 41/51* (2013.01); *C04B 41/88* (2013.01); *C04B 2111/00405* (2013.01); *F02B 23/0696* (2013.01); *F02B 2023/0612* (2013.01); *F02F 3/0084* (2013.01); *F02F 3/22* (2013.01); *F02F 2003/0061* (2013.01); *F02F 2200/06* (2013.01); *F05C 2201/021* (2013.01); *F05C 2201/028* (2013.01); *F05C 2201/0412* (2013.01); *F05C 2201/0436* (2013.01); *F05C 2251/048* (2013.01)

(56) References Cited

U.S. PATENT DOCUMENTS

| | | |
|---|---|---|
| 6,244,161 B1 | 6/2001 | Myers et al. |
| 2015/0204233 A1* | 7/2015 | Nanba ............... F02F 1/18 123/668 |
| 2016/0169185 A1* | 6/2016 | Iwasaki ............. F02F 3/14 123/305 |
| 2017/0248099 A1* | 8/2017 | Wagner ............. F01B 7/14 |

FOREIGN PATENT DOCUMENTS

| | | |
|---|---|---|
| JP | S61127847 A | 6/1986 |
| WO | 2015029985 A1 | 3/2015 |

* cited by examiner

PISTON WITH THERMALLY INSULATING INSERT AND METHOD OF CONSTRUCTION THEREOF

CROSS-REFERENCE TO RELATED APPLICATION

This application claims the benefit of U.S. Provisional Application Ser. No. 62/318,353, filed Apr. 5, 2016, which is incorporated herein by reference in its entirety.

BACKGROUND OF THE INVENTION

1. Technical Field

This invention relates generally to pistons for internal combustion engines and to their methods of manufacture.

2. Related Art

As a result of increasingly stringent emissions and fuel economy legislation, modern light vehicle diesel engines have to run more efficiently. In addition, engine manufacturers have indicated that mid-speed diesel engines will be prime sources of power for the foreseeable future. One challenge associated with such engines is the need to increase brake thermal efficiency (BTE), which is already beyond 45%. Such engines must run hotter and at higher peak pressures to achieve a greater brake thermal efficiency. Thermal losses through the combustion chamber become problematic under these increased demands. Typically, 4 to 6% of available fuel energy is lost as heat through pistons of the engine into the cooling system.

Engines known to have good BTE are meter-sized, large bore (LB)/low speed (50–70⁻ RPM) diesel engines, running at 50% to 55% BTE. However, there is a thermodynamic limitation on how high the BTE of these finite expansion engines can go, given by the equivalent ideal air cycle, which is about 60%. Therefore, incremental gains to be expected from the reciprocating engine itself are in the single digits. A law of diminishing returns is well established here. Major improvements are only possible if these engines work in a compound heat and power mode, wherein BTE for the entire system of 90% or more has been demonstrated. Heat transfer processes are most efficient when done between sources at highest and lowest temperatures. Thus, energy losses to components in the power cylinder unit (PCU) should be avoided to the extent possible, and that energy should be made available at its highest temperature through exhaust gases.

To achieve the goal of improved brake thermal efficiency, it has been proposed to insulate a crown of the piston, for example with a ceramic material having a low heat transfer coefficient. Historically, this has been a very complex and short lived solution due to the different thermal expansion coefficients of the ceramic and metal materials, and the brittle nature of the ceramic material.

One proposed solution is a thin, graded ceramic coating, such as partially stabilized zirconia (PSZ) on top of a bond coating, such as NiCrAlY. However, this type of coating has a limited life, 10,000 hours or less being typical at best. The ceramic coatings also tend to erode/flake off the piston due to cyclic bending/flexing and the explosive nature of diesel combustion. In addition, injected fuel can become entrained in the pores of the ceramic coating and subsequently detonate, shattering the coating. Thus, such coatings are unsuitable for use in engines with typical lives (time between overhauls) ranging from 20,000 to 60,000 hours.

An alternative to the ceramic coating is to mechanically lock a monolithic piece of ceramic, such as a ceramic puck, to a metal substrate, and wherein the ceramic puck is pre-formed or machined to an adequate combustion chamber shape. However, locking the ceramic puck by purely a mechanical means not only requires a complex, costly design, but also, but the ceramic and metal parts tend to separate at elevated operating temperatures much sooner than desired. When a ceramic puck is attached to a substrate formed of aluminum, the ceramic puck typically separates because the aluminum cannot provide the strength necessary to retain the puck at the elevated temperatures. If the substrate is cast iron or steel, the ceramic puck must be maintained under compressive stresses, which further contributes to the problem of there being no production friendly method of forming a piston by attaching a ceramic puck to a metal substrate.

SUMMARY OF THE INVENTION

One aspect of the invention provides a production friendly thermally insulated piston which increases brake thermal efficiency of a diesel engine. The piston includes a thermally insulating insert forming at least a portion of an upper crown. The thermally insulating insert has pores with the shape of a sponge-like structure or hollow roots or veins extending from a base surface of the insert toward an upper combustion surface of the insert. The pores within the ceramic material are infused with a molten first metal material during construction, such that the molten first metal solidifies in locked fashion with the insert in the pores of the insert. The porosity of the thermally insulating insert decreases from the base surface toward the upper combustion surface, such that the upper combustion surface is entirely ceramic and void free and the base surface is predominately open with voids and infused with the metal material. The first metal material bonded to the base surface of the thermally insulating insert is attached to a substrate formed of a second metal material to form the remaining portion of the piston, including pin bosses and skirt panels.

Another aspect of the invention provides a method of constructing the piston by infusing the first metal material into the pores of the thermally insulating insert, wherein the thermally insulating insert forms at least a portion of an upper combustion surface, and then bonding a lower metal body portion to the first metal material to form the remainder of the piston, including pin bosses and skirt panels.

The sponge-like open pore structure of the thermally insulating insert, aside from facilitating the formation of a strong, reliable bond between the first metal material and the thermally insulating material, also mitigates the mismatch in thermal properties between the ceramic and metal materials, and thus avoids the problems typically associated with attempting to bond a ceramic material not having such sponge-like open core structure with metal materials and coatings, such as delamination, flaking, low adiabaticity, and spalling. The sponge-like open pore structure of the thermally insulating insert also provides an enhanced surface area of contact for the infused metal material to bond with, through which mechanical stresses can be accommodated and counteracted. Thus, the resulting piston is expected to exceed the life expectancy of the comparative ceramic coated pistons not having such sponge-like open pore structure. The piston also allows for use of residual fuels, resists hot corrosion, resists oxidation, reduces ignition delay, and keeps fuel energy in the gas stream for a compound heat and power concept.

In accordance with one aspect of the invention, a piston for an internal combustion engine includes an upper crown formed at least in part by a first metal material and a thermally insulating insert. The upper crown has an upper wall forming an upper combustion surface and having a ring belt region depending from the upper wall. The ring belt region has a plurality of ring grooves, and the upper combustion surface is formed at least in part by the thermally insulating insert. The thermally insulating insert has a base surface with pores extending upwardly therein toward the upper combustion surface. The first metal material is infused and solidified in the pores to bond the first metal material to the thermally insulating insert, with the first metal material forming a first bonding surface. The piston further includes a body portion formed from a second metal material separate from the first metal material. The body portion provides pin bosses having coaxially aligned pin bores and diametrically opposite skirt portions. The body portion has a second bonding surface bonded to the first bonding surface of the first metal material.

In accordance with another aspect of the invention, the pores decrease in volume from the base surface toward the upper combustion surface, such that the upper combustion surface is dense relative to the base surface.

In accordance with another aspect of the invention, the pores are asymmetrically shaped providing said porosity having a sponge-like appearance, thereby providing the surface to which the first metal material is attached with an enhanced surface area to ensure a reliable strong bond in formed between the thermally insulating material and the first metal material.

In accordance with another aspect of the invention, the upper combustion surface can be formed entirely from the thermally insulating insert.

In accordance with another aspect of the invention, the first metal material can form a portion of the upper combustion surface.

In accordance with another aspect of the invention, the upper wall has an exposed undercrown surface facing away from the upper combustion surface, wherein the undercrown surface can be formed at least in part by the thermally insulating material.

In accordance with another aspect of the invention, the first metal material and the second metal material can be provided as the same types of metal material.

In accordance with another aspect of the invention, the first and second metal materials can be provided as one of an aluminum-based material, an iron-based material, a magnesium-based material, and a titanium-based material.

In accordance with another aspect of the invention, a metal coating layer can be bonded to the thermally insulating material inside the voids to facilitate bonding of the first metal material to the thermally insulative material.

In accordance with another aspect of the invention, the first metal material can form at least a portion of the ring belt region.

In accordance with another aspect of the invention, the second metal material can form at least a portion of the ring belt region.

In accordance with another aspect of the invention, the first metal material is welded to the second metal material.

In accordance with another aspect of the invention, the second metal material is cast about the first metal material.

In accordance with another aspect of the invention, a method of constructing a piston for an internal combustion engine is provided. The method includes forming a thermally insulating insert, having a base surface and an opposite surface providing at least a portion of an upper combustion surface, with pores extending upwardly into the base surface toward the upper combustion surface, from a ceramic material. Further, infusing a first metal material into the pores and solidifying the first metal material to bond the first metal material to the thermally insulating insert, and forming the first metal material having a first bonding surface. Further yet, forming a body portion, having pin bosses with coaxially aligned pin bores and diametrically opposite skirt portions and a second bonding surface, from a second metal material. Then, bonding the first bonding surface of the first metal material to the second bonding surface of the body portion.

In accordance with another aspect of the invention, the method can further include forming the pores decreasing in porosity from the base surface toward the upper combustion surface.

In accordance with another aspect of the invention, the method can further include forming the pores having an asymmetrically shaped, sponge-like appearance.

In accordance with another aspect of the invention, the method can further include forming the thermally insulating insert to provide the entirety of the upper combustion surface.

In accordance with another aspect of the invention, the method can further include forming the first metal material to provide a portion of the upper combustion surface.

In accordance with another aspect of the invention, the method can further include forming the thermally insulating insert to provide at least a portion of an undercrown surface opposite the upper combustion surface.

In accordance with another aspect of the invention, the method can further include providing the first metal material and the second metal material being the same types of metal material.

In accordance with another aspect of the invention, the method can further include providing the first and second metal materials as one of an aluminum-based material, an iron-based material, a magnesium-based material, and a titanium-based material.

In accordance with another aspect of the invention, the method can further include bonding a metal coating layer to the thermally insulating material inside the voids and then bonding the first metal material to the metal coating layer.

In accordance with another aspect of the invention, the method can further include forming the first metal material to provide at least a portion of a ring belt region.

In accordance with another aspect of the invention, the method can further include forming the second metal material to provide at least a portion of a ring belt region.

In accordance with another aspect of the invention, the method can further include welding the first metal material to the second metal material.

In accordance with another aspect of the invention, the method can further include casting the second metal material about the first metal material.

BRIEF DESCRIPTION OF THE DRAWINGS

These and other aspects, features and advantages of the invention will become more readily appreciated when considered in connection with the following detailed description, appended claims and accompanying drawings, in which:

DETAILED DESCRIPTION OF PRESENTLY PREFERRED EMBODIMENTS

Figure 1:
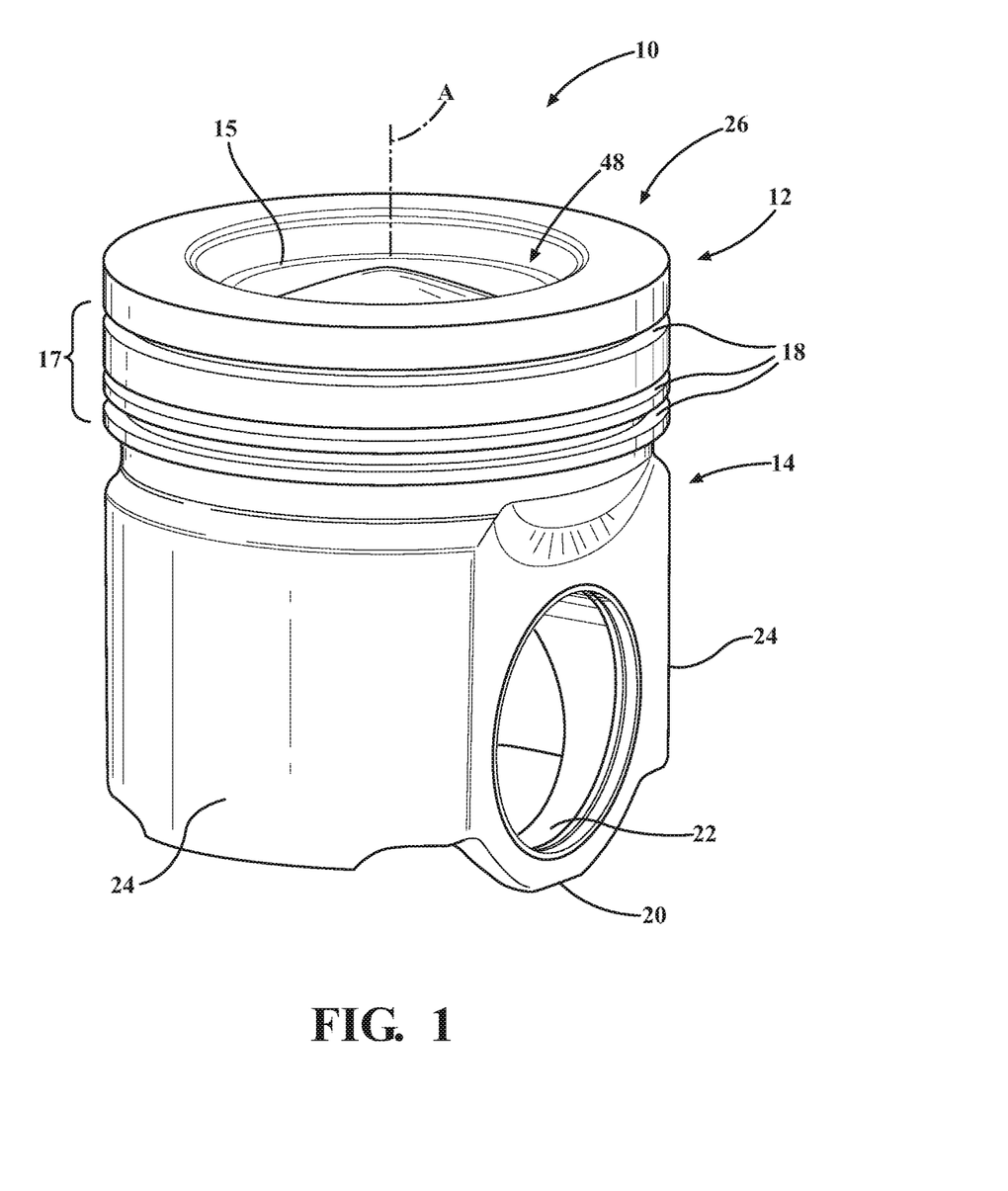
FIG. 1 is a perspective view of a piston constructed in accordance with one aspect of the invention.

Referring in more detail to the drawings, FIG. 1 illustrates a piston 10 constructed in accordance with one aspect of the invention. The piston 10 is well suited for a diesel combustion engine and is capable of increasing brake thermal efficiency (BTE) of the engine. The piston 10 can comprise various different designs and features as discussed hereafter and as illustrated in the different FIGS. 2-3A of presently preferred embodiments, wherein the different embodiments are designated by the same reference numeral 10, offset with respective prime symbols (', '', ''', '''', ''''') where appropriate to represent different embodiments from one another.

The piston 10 of one example embodiment includes an upper crown 12 and a body portion 14 each formed, at least in part, of a metal material, such as an iron-based material, aluminum-based material, magnesium-based material, and/or another metal material, including a titanium-based alloy, by way of example and without limitation, as desired for the demands of the particular vehicle application. In demanding applications, steel, such as 4140 steel, is preferably used as the metal material. Magnesium alloys or aluminum alloys could be used in less physically demanding applications. The upper crown 12 includes an upper wall 15 forming an exposed upper combustion surface 16 for direct exposure to a combustion chamber and an undercrown surface 19 facing away from the upper combustion surface 16. The upper crown 12 further includes a ring belt region 17 depending from the upper wall 15 and providing a plurality of ring grooves 18 for containing known types of piston rings (not shown) which engage a cylinder liner during engine operation. The body portion 14 of the piston 10 extends along a central longitudinal axis A along which the piston 10 reciprocates in use, and includes a pair of pin bosses 20, each defining a pin bore 22, with the pin bosses 20 being spaced laterally from one another such that the pin bores 22 are coaxially aligned with one another, with diametrically opposed skirt panels 24 extending between the pin bosses 20.

The piston 10 also includes a thermally insulating insert 26 to reduce heat loss through the piston 10 when the piston 10 is used in a diesel engine, wherein the insert can take on different configures, as desired for the intended application, with some different configurations being shown in the various pistons 10' (FIG. 2A); 10'' (FIG. 2B); 10''' (FIG. 2C); 10'''' (FIG. 2D), and 10''''' (FIG. 2E), with the inserts being identified by the same reference numeral 26, offset by respective prime symbols (', '', ''', '''', '''''). Due to the thermal insulation effect, heat loss through the piston 10, 10', 10'', 10''', 10'''', 10''''' is reduced in comparison to a piston having the same configuration but not having the insert 26, 26', 26'', 26''', 26'''', 26''''' and thus the temperature of combustion and brake thermal efficiency is increased.

The thermally insulating insert 26, 26', 26'', 26''', 26'''', 26''''' is formed of a ceramic material or thermally insulating composite mixture, with discussion hereafter referencing the inserts by the single reference numeral 26 for sake of ease, though it is to be recognized that the discussion pertains to each insert 26, 26', 26'', 26''', 26'''', 26''''' unless otherwise stated. The thermally insulating insert 26 forms at least a portion of the upper crown 12 and a least a portion of the upper combustion surface 16. The thermally insulating insert 26 includes a plurality of elongate, meandering pores 28 having the shape and appearance of a sponge-like structure or asymmetrical roots or veins, as best shown, by way of example, in enlarged side cross-sectional views of FIGS. 3 and 3A, extending upwardly from a lowermost base surface 30 of the insert 26 toward the upper combustion surface 16, but stopping short of reaching the upper combustion surface 16. Accordingly, the pores 28 are asymmetrically shaped as view in cross-section taken generally along the longitudinal axis A, with the asymmetry being owed to a method of construction in accordance with another aspect of the invention.

The pores 28 of the ceramic material are infused and filled with a first metal material 32, which is preferably the same type of metal material as a second metal material 34 used to form the remaining body portion 14 of the piston 10 in a subsequent operation. The porosity of the thermally insulating insert 26 decreases from the base surface 30 to the upper combustion surface 16, such that the upper combustion surface 16 is entirely ceramic and free of pores, while the base surface 30 is predominately porous, wherein the porosity gradually decreases from the base surface 30 toward the upper combustion surface 16.

Figure 2:
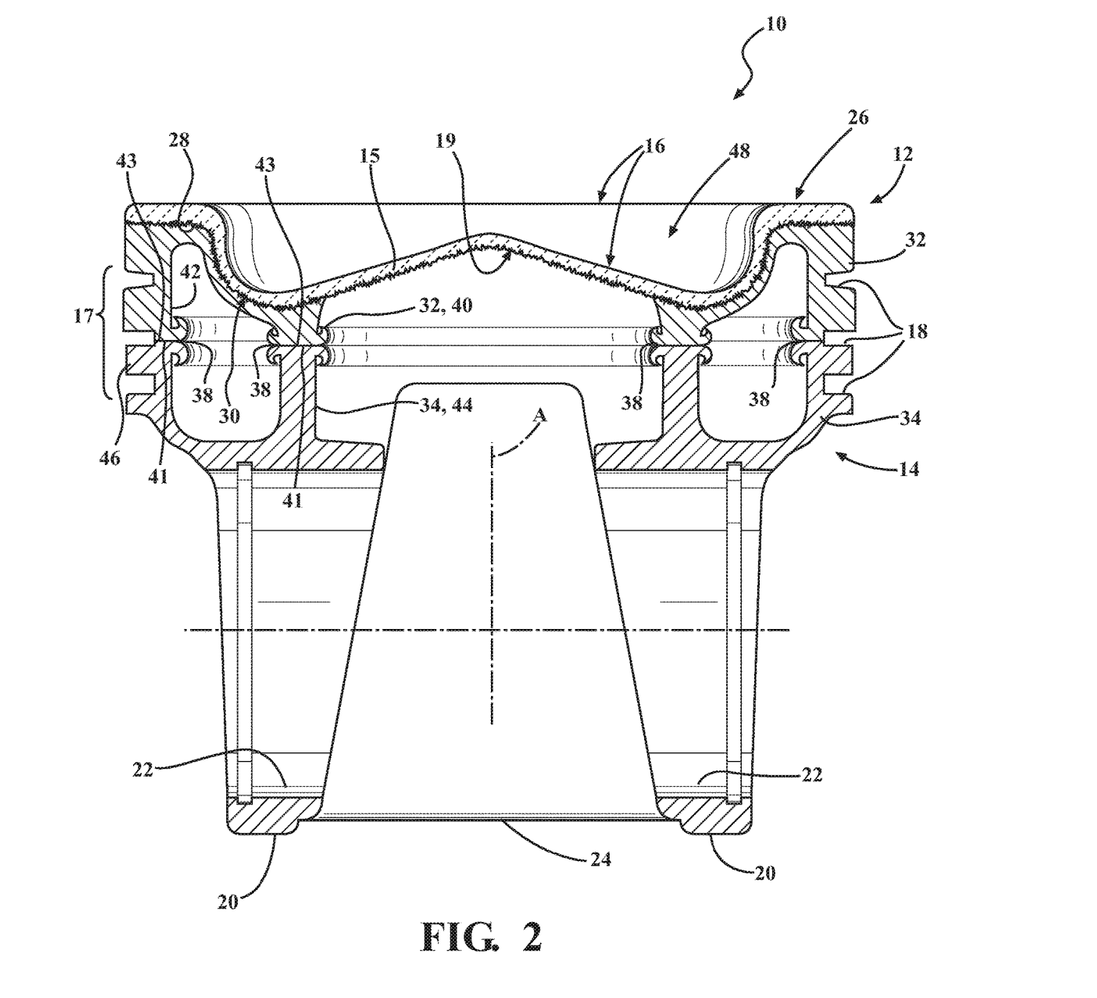
FIG. 2 is a cross-sectional side view taken generally along a central longitudinal axis of a piston constructed in accordance with another aspect of the invention.
Figure 2A:
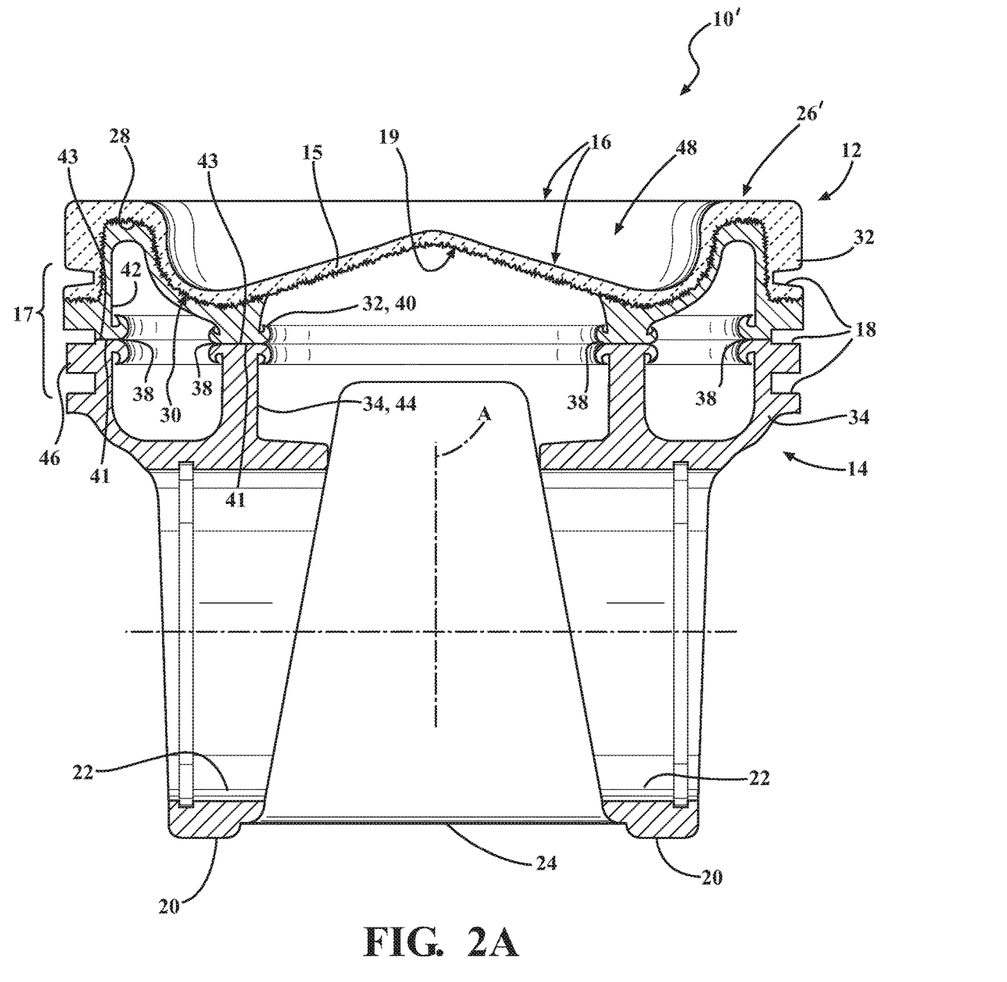
FIG. 2A is a view similar to FIG. 2 of a piston constructed in accordance with yet another aspect of the invention.
Figure 2B:
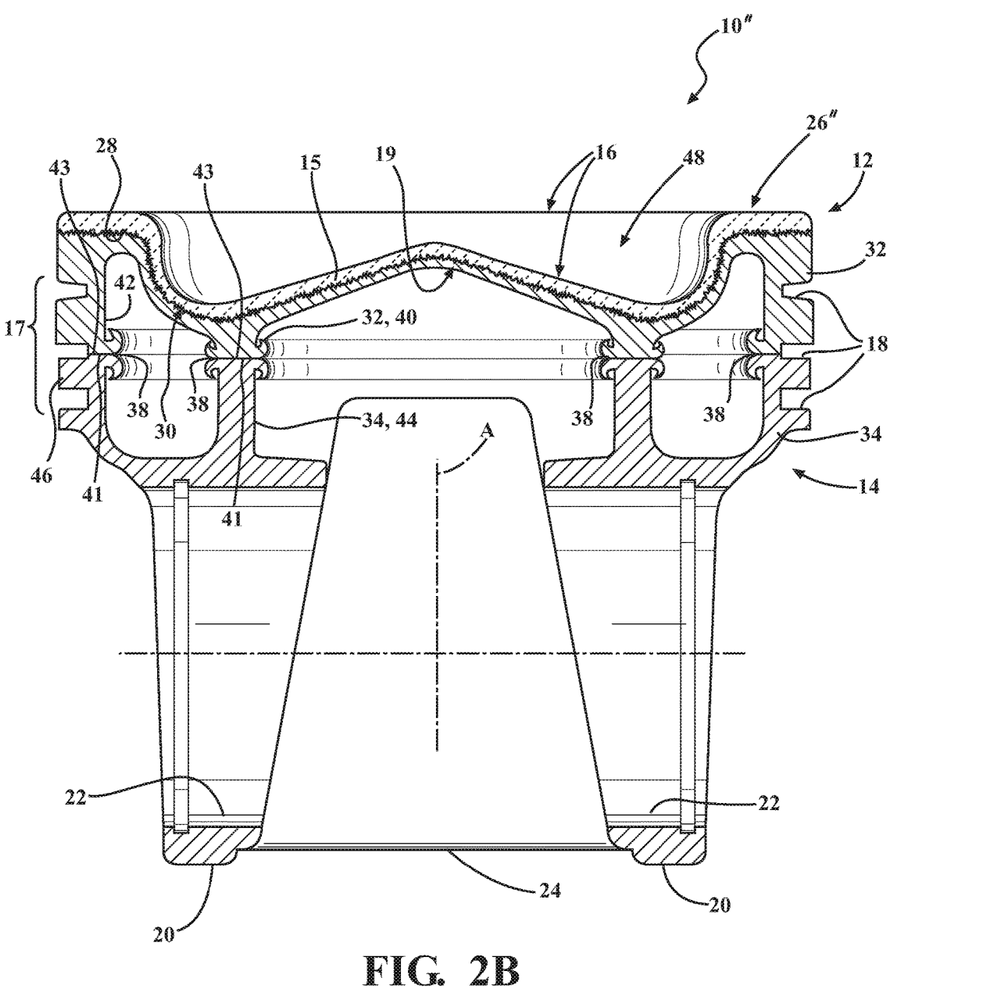
FIG. 2B is a view similar to FIG. 2 of a piston constructed in accordance with yet a further aspect of the invention.
Figure 2C:
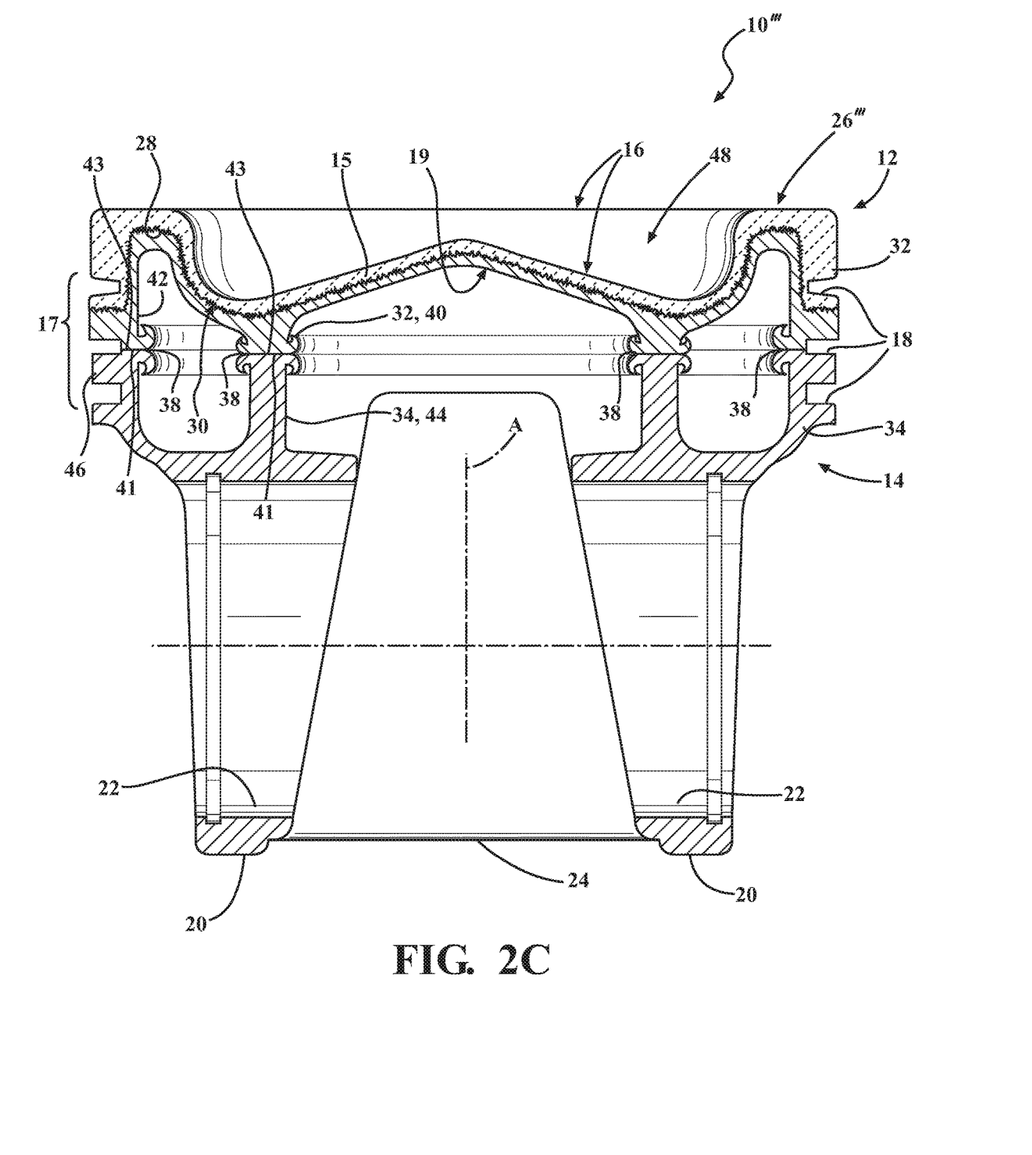
FIG. 2C is a view similar to FIG. 2 of a piston constructed in accordance with yet a further aspect of the invention.
Figure 2D:
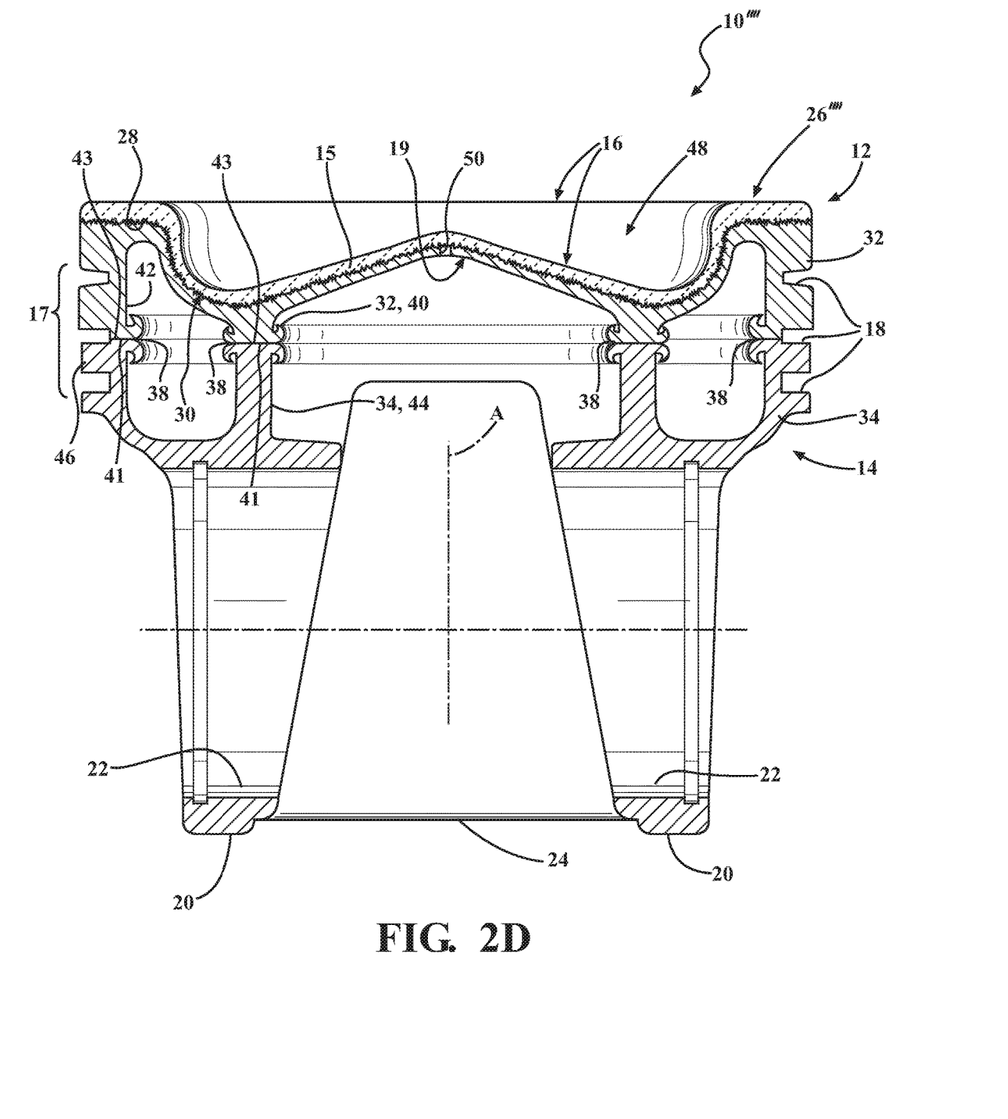
FIG. 2D is a view similar to FIG. 2 of a piston constructed in accordance with yet a further aspect of the invention.
Figure 2E:
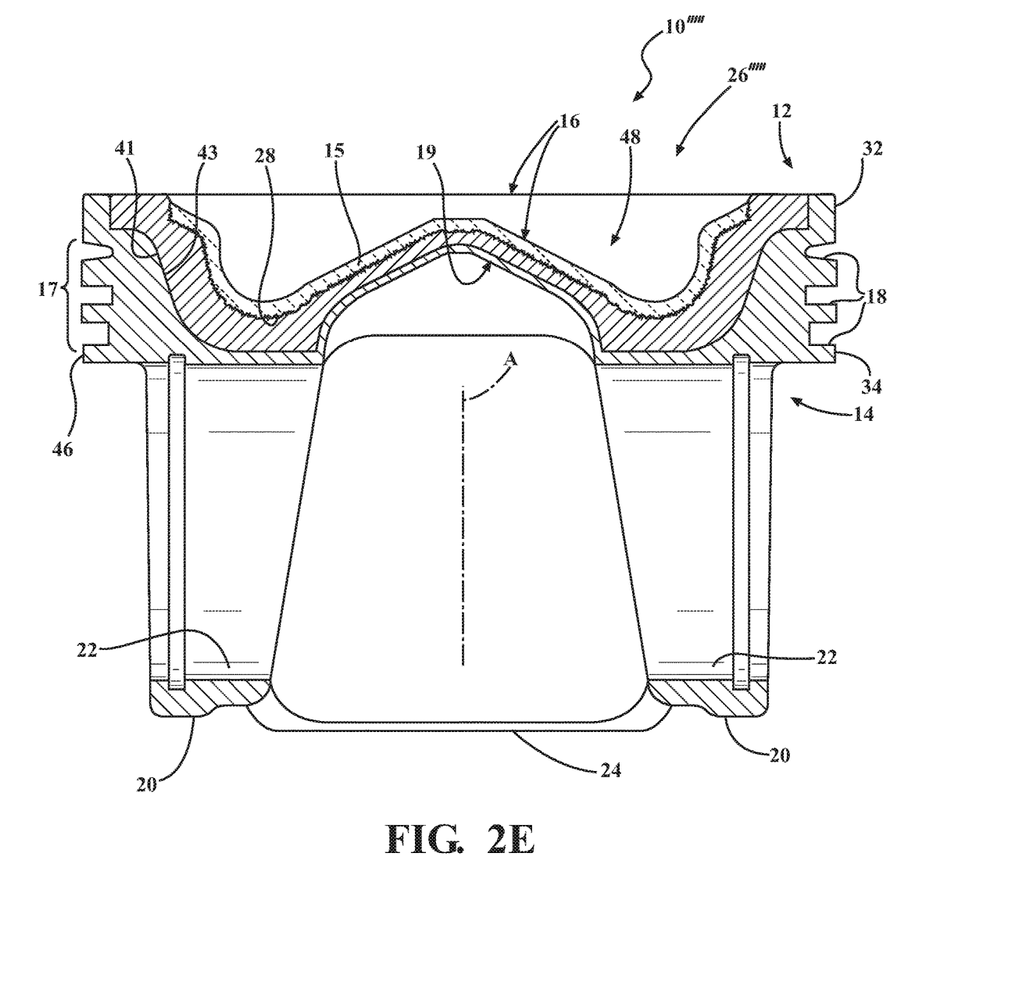
FIG. 2E is a view similar to FIG. 2 of a piston constructed in accordance with yet a further aspect of the invention.
Figure 3:
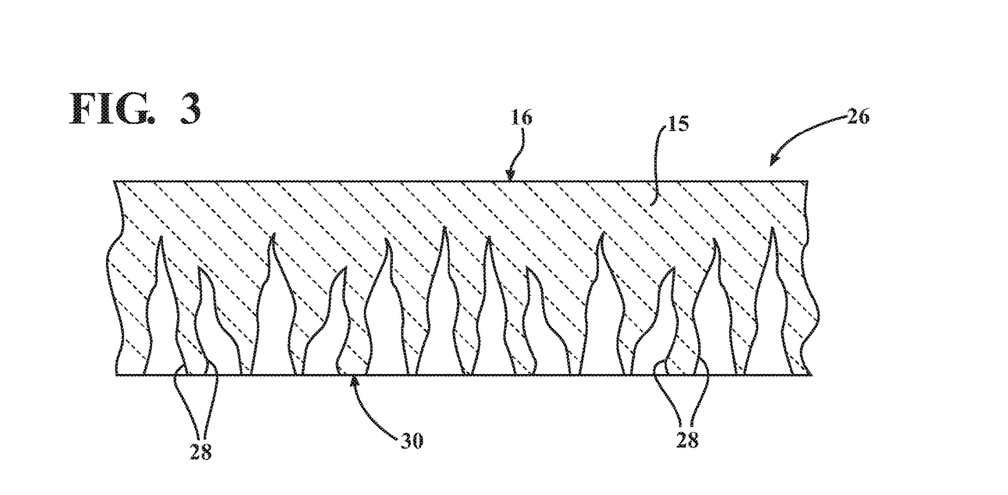
FIG. 3 is a partial cross-sectional view of an upper combustion surface of a piston constructed in accordance with another aspect of the invention.

The thermally insulating insert 26 is infused with the first metal material 32 so that the base surface 30 is covered, at least in part or completely, with the first metal material 32. The first metal material 32 bonded to the base surface 30 of the thermally insulating insert 26 is then attached to the second metal material 34 which forms the remaining body portion 14 of the piston 10. According to one embodiment, as shown in FIG. 2, the first metal material 32 is shown being bonded along a portion of the base surface 30 to form concentric annular first bonding surfaces 41 at the ends of inner and outer ribs 40, 42, wherein the first metal material 32 is joined to second bonding surfaces 43 at the ends of concentric annular inner and outer ribs 44, 46 of the second metal material 34 which forms the body portion 14, such as by forming a weld joint 38 between the respective bonding surfaces 41, 43 of the inner and outer ribs of the upper crown 12 and body portion 14, by way of example and without limitation, such as via friction welding or hybrid induction welding, pulse detonation, or another method. The thermally insulative insert 26 is shown as forming the entirety of the upper combustion surface 16 and the undercrown surface 19 extending radially inwardly from the inner ribs 40, 44, by way of example and without limitation. In accordance with another embodiment, as shown in FIG. 2A, the piston 10' is similar to the piston 10 of FIG. 2, however, the thermally insulating insert 26 is shown as forming an uppermost piston ring groove 18, while the lower piston ring grooves 18 are shown as being formed by the first and second metal materials 32, 34. In yet another embodiment, as shown in FIG. 2B, the piston 10" is again similar to the piston 10, wherein the thermally insulating insert 26 forms the entirety of the upper combustion surface 16, however, unlike the piston 10, the undercrown surface 19, extending radially inwardly of the inner ribs 40, 44, is formed by the first metal material 32, such that the entire under base surface 30 of the thermally insulating insert is completely covered by the first metal material 32. In yet another embodiment, as shown in FIG. 2C, the piston 10''' is similar to the piston 10', wherein the thermally insulating insert 26 forms the entirety of the upper combustion surface 16 and an uppermost ring groove 18, however, unlike the piston 10', the undercrown surface 19, extending radially inwardly of the inner ribs 40, 44, is formed by the first metal material 32, such that the entire under base surface 30 of the thermally insulating insert is covered by the first metal material 32. In yet another embodiment, as shown in FIG. 2D, the piston 10'''' is again similar to the piston 10, wherein the thermally insulating insert 26 forms the entirety of the upper combustion surface 16, however, unlike the piston 10, the undercrown surface 19, extending radially inwardly of the inner ribs 40, 44, is formed in part by the first metal material 32 and in part by the thermally insulating insert 26. As such, a portion of under base surface 30 of the thermally insulating insert is openly exposed and a portion of under base surface 30 of the thermally insulating insert is covered by the first metal material 32. In the embodiment shown, the first metal material 32 extends radially inwardly from the inner ribs 40, 44 to a small open region or opening 50 formed in the first metal material 32 beneath a peak of the upper combustion surface 16, wherein the opening 50 can be a small as desired, such as about 1/2mm, or as large as desired, while maintaining at least some of the first metal material 32 on the undercrown surface 19. Accordingly, benefits of support to the thermally insulating material 26 provided by the first metal material 32 can be realized, while also benefiting from having the high temperature resistant, thermally insulative material 32 at least partially exposed on the undercrown surface 19. Further, in yet another embodiment, as shown in FIG. 2E, the piston 10''''' is again similar to the piston 10, however, rather than the thermally insulating insert 26 forming the entirety of the upper combustion surface 16, the thermally insluting insert 26 forms only a portion, shown as a central portion of the upper combustion surface 16, and shown as forming a combustion bowl region 48. In addition, the first metal material 32 is shown as forming the undercrown surface 19, but stops radially short of the outer surface of the ring belt region 17, such that the second metal material forms the entirety of the ring belt region 17, as well as an outermost annular portion of the upper combustion surface 16. In the embodiment of FIG. 2E, the second metal material 34 can be cast around the first metal material 32 that is infused in and bonded to the thermally insulating insert 26, rather than being welded, as shown in FIGS. 2-2D. As such, in this case, the second metal material 34 forms an outer cast shell around the thermally insulating insert 26, wherein a second bonding surface 43 of the cast second material 34 is bonded to a first bonding surface 41 of the first metal material 32, wherein the second metal material 34 forms the entirety of the ring belt region 17. However, at least a significant portion of the upper combustion surface 16 of the thermally insulating insert 26 remains exposed, shown as covering the entirety, or substantial entirety of the combustion bowl region 48.

Infusing the metal material in the pores 28 of the ceramic material of the insulating insert 26 mitigates the thermal property mismatch between the ceramic and metal materials. Thus, the problems of delamination and spalling and avoided. Various different ceramic compositions can be used to form the thermally insulating insert 26. The ceramic material is typically a few millimeters in thickness. The ceramic material is also preferably castable and machineable, which allows different geometries to be realized, including re-entrant bowls and valve pockets. Example materials that can be used to form the thermally insulating insert 26 include alumina ($Al_2O_3$) and a silicon nitride ceramic ($SiN_4$). Alternatively, a composite mixture of materials having a low thermal conductivity can be used to form the thermally insulating insert 26, such as a carbon-carbon mixture or pyrolized composite, or a thermoset polymer such as a phenolic or epoxy containing reinforcing fibers and inorganic fillers. In the example embodiments, the thermally insulating insert 26 is a monolithic piece of ceramic material. Preferably, the ceramic material is a pure and close to zero porosity ceramic at the upper combustion surface 16 exposed to combustion, which ensures longevity due to no flaking and maximum adiabaticity. Thus, flexing/bending/flaking are counteracted and minimized by virtue of its high temperature capabilities, chemical inertness, compressed state in the piston 10. The multitude of bonding regions provided by the pores 28 of the insert 26 allows the melted first metal material 32 to flow therein and solidify to form a strong, reliable bond with the ceramic puck insert 26. It is to be recognized that the solidified root-like projections of the first metal material 32 in combination with the meandering, asymmetrical walls of the pores 28 form lightly locked and bonded surfaces with one another to resist separation therebetween, which would not be possible if the pores 28 had smooth, symmetrical surfaces.

The thermally insulating insert 26 is formed using a sintering process which provides a desired porosity, texture, and shape along the base surface 30 which provides the interface to the infused first metal material 32. The shape of the upper combustion surface 16, base surface 30, and other surfaces can be pre-formed in the thermally insulating insert 26, before infusing the first metal material 32 into the pores 28. Alternatively, the shape of the upper combustion surface 16, base surface 30, and other surfaces can be machined or otherwise formed after the thermally insulating insert 26 is infused with the first metal material 32. In some embodiments, as shown in FIGS. 2, 2A and 2D, the base surface 30 of the thermally insulating insert 26, 26', 26'''' forms at least a portion of the exposed undercrown surface 19 of the piston 10.

Figure 3A:
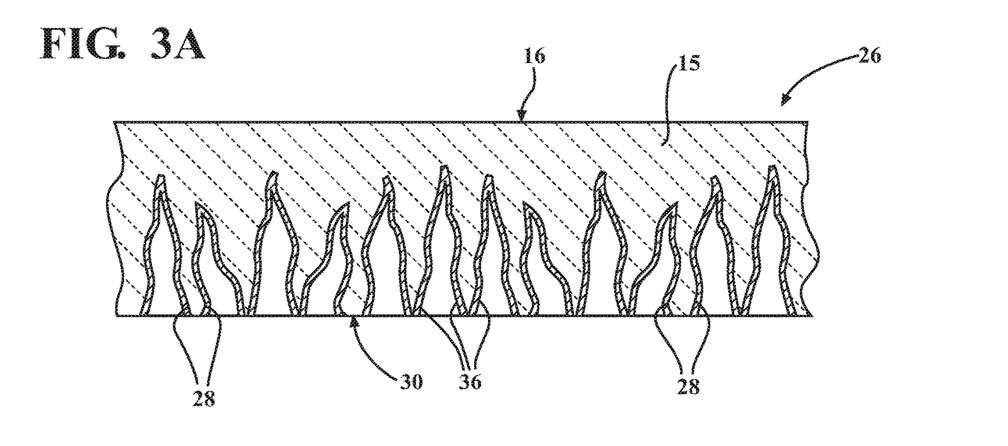
FIG. 3A is a view similar to FIG. 3 of an upper combustion surface of a piston constructed in accordance with yet another aspect of the invention.

As shown in FIG. 3A, the thermally insulating insert 26 can also include a metal coating 36 applied and bonded to the base surface 30 and/or to the inside surfaces of the insulative material 26 bounding the pores 28 of the thermally insulating insert 26 to improve the bond between the ceramic or composite material and the melted first metal material 32. For example, the base surface 30, including the pores 28 extending therein, can be metallized by PVD, thermal spray, or electroless nickel coated.

Another aspect of the invention provides a method of constructing the piston 10 including the thermally insulating insert 26. The method typically begins by forming the thermally insulating insert 26 from the ceramic or composite material. In the example embodiment, the thermally insulating insert 26 is formed by casting the ceramic or composite material around a porous network of salt prills, also referred to as a porous salt core. An example method includes weighing the salt, placing the salt in a beaker or other suitable container or mold (shaped as desired), forming the salt into the shape of a three-dimensional salt core which has a macro-porous upper region and a densely packed underside. The method further includes allowing the salt to rest in a humid atmosphere, such as for a period of hours, and then drying the salt in an oven to form the finished porous salt core. The composition of the salt core in accordance with one example embodiment can be formed of sodium nitrate (NaNO$_3$), by way of example and without limitation.

The method of the example embodiment next includes casting a two-part ceramic mixture around the salt core, and curing the cast ceramic mixture in a vacuum desiccator. Curing can be performed at room temperature or at elevated temperatures up to 300° C., depending on the ceramic composition and the melting temperature of the salt. The casting step can include forming the upper combustion surface 16, base surface 30, or other surfaces to a desired shape, including a desired finish shape, or shape to be subsequently machined. Any salt remaining after the casting step can be dissolved out of the cured ceramic material using an ultrasound bath, or otherwise, followed by drying. Once the salt is dissolved or otherwise removed, the remaining thermally insulating insert 26 has a macro-porous underside providing the pores 28 and a dense upper region being void or substantially void of the pores 28.

The method next includes infusing the first metal material 32 into the pores 28 of the thermally insulating insert 26 while the first metal material is in a melted, molten state. The melted first metal material 32 can be infused to flow into the thermally insulating insert 26 using a forcing ram, gravity, squeeze casting machine, or a typical forging die. When the first metal material 32 is steel, forging is typically preferred. When the first metal material 32 is aluminum, casting is typically preferred.

The infusing step of the example method includes placing the thermally insulating insert 26 in a mold, pouring the melted first metal material 32 into the mold, forcing or infusing the first melted metal material 32 into the pores 28 of the thermally insulating insert 28, and maintaining the thermally insulating insert 26 in the mold until the first metal material 32 solidifies. The first metal material 32 can be formed to a preferred shape in the mold. For example, the first melted metal 32 material can be shaped to form at least a portion of the undercrown surface 19 (FIGS. 2B, 2C, 2D) and/or side surfaces, including at least a portion of the ring belt region 17 (FIGS. 2-2D), of the piston 10. Once the first metal material 32 is solidified and bonded to the thermally insulating insert 26, the bonded subassembly of the insulative insert 26 and first metal material 32 can be removed from the mold.

The method further includes optionally machining the thermally insulating insert 26 and/or bonded first metal material 32 to a desired shape, and then attaching the first metal material 32 bonded to the thermally insulating insert 26 to the remaining body portion 14 of the piston 10. The example embodiment includes facing off the casting of the second metal material 34 in a lathe, and machining the upper combustion surface 16 of the insulative insert 26 to a desired shape. The finishing step can be conducted before or after attaching the first metal material 32 bonded to the thermally insulating insert 26 to the remaining body portion 14 of the piston 10.

Various different techniques can be used to join the first metal material 32 bonded to the thermally insulating insert 26 to the second metal material 34 forming the remaining body portion 14 of the piston 10. In one example embodiment, the first metal material 32 bonded to the base surface 30 of the thermally insulating insert 26 can be joined to the second metal material 34 of the remaining body portion 14 by welding, for example friction or hybrid induction welding (FIGS. 2-2D). In another embodiment, the thermally insulating insert 26 and first metal material 32 can be joined to the second metal material 34 of the remaining body portion 14 by casting or molding the second metal material thereabout (FIG. 2E). The first metal material 32 can also be joined to the remaining body portion 14 by pulse-detonation. Regardless of the method used to join the first and second metal materials 32, 34 to one another, a strong, robust bond is formed between the metal materials 32, 34, particularly when they are provided as the same type of metal, thereby resulting in a strong, durable piston 10, 10', 10", 10''', 10'''', 10''''' having a long, useful life in high performance, modern engine applications.

Many modifications and variations of the present invention are possible in light of the above teachings and may be practiced otherwise than as specifically described while remaining within the scope of the claims. It is contemplated that all features of all claims and of all embodiments can be combined with each other, so long as such combinations would not contradict one another.

What is claimed is:

1. A piston for an internal combustion engine, comprising:
an upper crown formed at least in part by a first metal material and a thermally insulating insert, said upper crown having an upper wall forming an upper combustion surface and having a ring belt region depending from said upper wall, said ring belt region having a plurality of ring grooves, said upper combustion surface being formed at least in part by said thermally insulating insert, said thermally insulating insert having a base surface with pores extending upwardly into said base surface toward said upper combustion surface, said first metal material being infused and solidified in said pores to bond said first metal material to said thermally insulating insert, said first metal material forming a first bonding surface; and
a body portion formed from a second metal material separate from said first metal material, said body portion forming pin bosses having coaxially aligned pin bores and diametrically opposite skirt portions, said body portion having a second bonding surface bonded to said first bonding surface of said first metal material.

2. The piston of claim 1, wherein said pores provide said thermally insulating insert with a porosity, said porosity decreasing from said base surface toward said upper combustion surface.

3. The piston of claim 2, wherein said pores are asymmetrically shaped providing said porosity having a sponge-like appearance.

4. The piston of claim 1, wherein said upper combustion surface is formed entirely from said thermally insulating insert.

5. The piston of claim 1, wherein said first metal material forms a portion of said upper combustion surface.

6. The piston of claim 1, wherein said upper wall has an exposed undercrown surface facing away from said upper combustion surface, said undercrown surface being formed at least in part by said thermally insulating insert.

7. The piston of claim 1, wherein said first metal material and said second metal material are the same types of metal material.

8. The piston of claim 7, wherein said first and second metal materials are an aluminum-based material.

9. The piston of claim 7, wherein said first and second metal materials are an iron-based material.

10. The piston of claim 7, wherein said first and second metal materials are a magnesium-based material.

11. The piston of claim 7, wherein said first and second metal materials are a titanium-based material.

12. The piston of claim 1, further including a metal coating layer bonded to said thermally insulating insert inside said pores to facilitate bonding of said first metal material to said thermally insulative insert.

13. The piston of claim 1, wherein said first metal material forms at least a portion of said ring belt region.

14. The piston of claim 1, wherein said second metal material forms at least a portion of said ring belt region.

15. The piston of claim 1, wherein said first metal material is welded to said second metal material.

16. The piston of claim 1, wherein said second metal material is cast about said first metal material.

17. A method of constructing a piston for an internal combustion engine, comprising:
   forming a thermally insulating insert, having a base surface and an opposite surface providing at least a portion of an upper combustion surface, with pores extending upwardly into said base surface toward the upper combustion surface, from a ceramic material;
   infusing a first metal material into said pores and solidifying the first metal material to bond the first metal material to the thermally insulating insert, and forming the first metal material having a first bonding surface;
   forming a body portion, having pin bosses with coaxially aligned pin bores and diametrically opposite skirt portions and a second bonding surface, from a second metal material; and
   bonding the first bonding surface of the first metal material to the second bonding surface of the body portion.

18. The method of claim 17, further including forming the pores decreasing in porosity from the base surface toward the upper combustion surface.

19. The method of claim 18, further including forming the pores having an asymmetrically shaped, sponge-like appearance.

20. The method of claim 17, further including forming the thermally insulating insert to provide the entirety of the upper combustion surface.

21. The method of claim 17, further including forming the first metal material to provide a portion of the upper combustion surface.

22. The method of claim 17, further including forming the thermally insulating material to provide at least a portion of an undercrown surface opposite the upper combustion surface.

23. The method of claim 17, further including providing the first metal material and the second metal material being the same types of metal material.

24. The method of claim 17, further including providing the first and second metal materials as an aluminum-based material.

25. The method of claim 17, further including providing the first and second metal materials as an iron-based material.

26. The method of claim 17, further including providing the first and second metal materials as a magnesium-based material.

27. The method of claim 17, further including providing the first and second metal materials as a titanium-based material.

28. The method of claim 17, further including bonding a metal coating layer to the thermally insulating material inside the pores to facilitate bonding the first metal material to the thermally insulative material.

29. The method of claim 17, further including forming the first metal material to provide at least a portion of a ring belt region.

30. The method of claim 17, further including forming the second metal material to provide at least a portion of a ring belt region.

31. The method of claim 17, further including performing the bonding by welding the first metal material to the second metal material.

32. The method of claim 17, further including performing the bonding by casting the second metal material about the first metal material.

* * * * *